United States Patent [19]

Yoshimura et al.

[11] 4,396,084
[45] Aug. 2, 1983

[54] SUBSIDIARY FUEL TANK APPARATUS IN MOTORIZED TWO-WHEELED VEHICLE

[75] Inventors: Shigekazu Yoshimura, Asaka; Yoshio Nogami, Shiki; Kazuo Asakura, Kamifukuoka, all of Japan

[73] Assignee: Honda Giken Kogyo Kabushiki Kaisha, Tokyo, Japan

[21] Appl. No.: 252,172

[22] Filed: Apr. 8, 1981

[30] Foreign Application Priority Data

Apr. 22, 1980 [JP] Japan ............................... 55-53984[U]
Apr. 22, 1980 [JP] Japan ............................... 55-53985[U]
Apr. 22, 1980 [JP] Japan ............................... 55-53987[U]

[51] Int. Cl.³ .......................................... B60K 15/00
[52] U.S. Cl. .................................... 180/219; 280/5 A
[58] Field of Search ............... 280/5 A, 5 R; 180/225, 180/219

[56] References Cited

U.S. PATENT DOCUMENTS 4,280,582  7/1981  Kouyama ........................ 180/225 X

FOREIGN PATENT DOCUMENTS 742766  1/1956  United Kingdom ................ 180/225

Primary Examiner—John A. Pekar
Attorney, Agent, or Firm—Armstrong, Nikaido, Marmelstein & Kubovcik

[57] ABSTRACT

A subsidiary fuel tank apparatus in a motorized two-wheeled vehicle of the type that a vehicle body frame having front and rear wheels is provided with an internal combustion engine in the middle, a fuel tank on the upper side, and a detachable driver's seat in the rear of the fuel tank. The vehicle body frame is provided at its rear portion with a pair of right and left back stays situated below the driver's seat and with a pair of front and rear cross members extending across the back stays so that a room space is formed between the cross members and below the driver's seat, and a subsidiary fuel tank is accommodated in the room space.

9 Claims, 7 Drawing Figures

SUBSIDIARY FUEL TANK APPARATUS IN MOTORIZED TWO-WHEELED VEHICLE

BACKGROUND OF THE INVENTION

1. Field of the Invention

This invention relates to a subsidiary fuel tank apparatus chiefly used in a motorized two-wheeled vehicle of alcohol fuel operated type.

2. Description of the Invention

As to a two-wheeled vehicle of this kind, there has been hitherto known such a type that a vehicle body frame having front and rear wheels is provided with an internal combustion engine in the middle, a fuel tank on the upper side and a driver's seat in the rear, and alcohol fuel is contained in the fuel tank so that the engine may be operated by the alcohol fuel. In general, the alcohol fuel is low in volatility, so that the engine is liable to be lowered in its starting ability especially in a cold condition. Accordingly there has been considered such a modification thereof that there is provided a subsidiary fuel tank additionally and gasoline fuel is contained therein so that the gasoline fuel may be used as an occasion demands. In this case, it is desirable that the subsidiary fuel tank is protected from an external force and is protected also from a heat generating portion of the engine.

SUMMARY OF THE INVENTION

This invention has for its object to provide an apparatus meeting this desire, and in an apparatus of the type that a vehicle body frame having front and rear wheels is provided with an internal combustion engine in the middle, a fuel tank on the upper side, and a detachable driver's seat in the rear, it is characterized in that the vehicle body frame is provided at its rear portion with a pair of right and left back stays situated below the driver's seat and with a pair of front and rear cross members extending across the back stays so that a room space is formed between the cross members and below the driver's seat, and a subsidiary fuel tank is accommodated in the space.

DETAILED DESCRIPTION OF THE PREFERRED EMBODIMENTS

Figure 1:
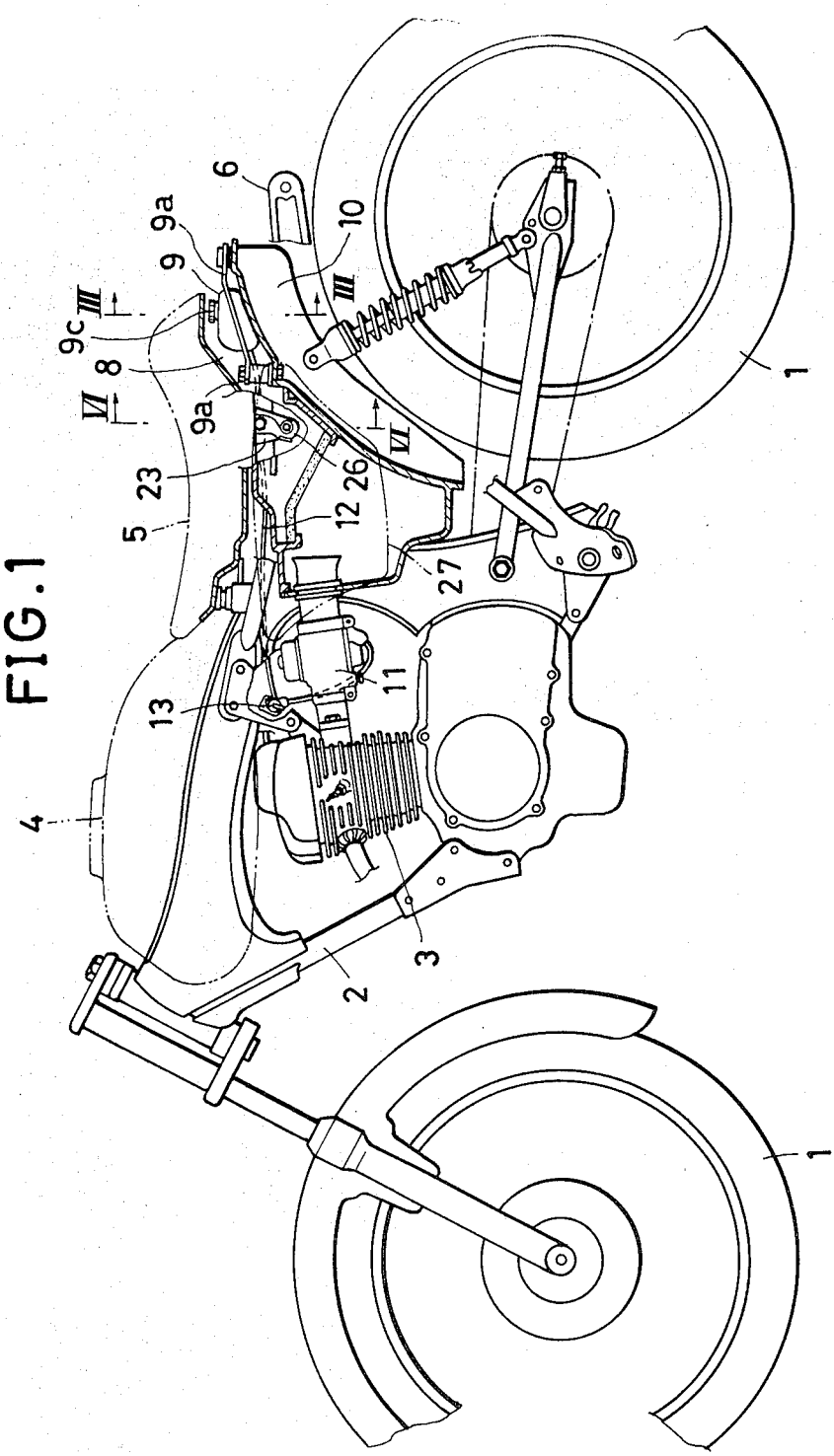
FIG. 1 is a side view, part in section, of one example of a motorcycle having this invention apparatus.

One embodying example of this invention will be explained with reference to the accompanying drawings.

Referring to the drawings, a vehicle body frame 2 having front and rear wheels 1, 1 is provided with an internal combustion engine 3 in the middle, a fuel tank 4 on the upper side, and a detachable driver's seat 5 in the rear, and the fuel tank 4 contains therein alcohol fuel, and thus there is constructed as a whole a motorized two-wheeled vehicle such as a motorcycle or the like of alcohol fuel operated type.

The vehicle body frame 2 is provided at its rear portion with a pair of right and left back stays 6, 6 situated below the driver's seat 5, and a pair of front and rear cross members 7, 7 extending across the back stays 6, 6, so that a space 8 is formed below the seat 5 and between the cross members 7, 7 and a subsidiary fuel tank 9 is housed in the space 8. This tank 9 is used for containing therein gasoline fuel.

The subsidiary fuel tank 9 is provided with a pair of front and rear attaching arms 9a, 9a and is attached at its arms 9a, 9a to the foregoing front and rear cross members 7, 7. Numeral 9b denotes a fuel filler opening made in the top surface of the tank 9, numeral 9c denotes a closure member for closing the opening 9b, and numeral 10 denotes a rear fender situated below the tank.

The fuel tank 4 is in communication with a carburetor 11 of the engine 3 through a fuel passage (not shown) and the fuel tank 9 is in communication with the carburetor 11 through an additional fuel passage 12, and the fuel passage 12 has a metering pump 13 interposed therein, and it is so arranged that in an ordinary case the fuel in the tank 4, that is, the alcohol fuel, is supplied to the carburetor 11, but if the pump 13 is operated as desired, the fuel in the tank 9, that is, the gasoline fuel is supplied to the carburetor 11 after being measured by the pump 13.

The operation of the foregoing apparatus will be explained as follows:

In an ordinary case, the engine 3 is operated by being supplied with the fuel in the fuel tank 4 on the upper side thereof, that is, the alcohol fuel, but if the metering pump 13 is operated as an occasion demands, the engine is supplied with the fuel in the subsidiary fuel tank 9 in the rear thereof, that is, the gasoline fuel so that the engine may be prepared for starting in a cold condition.

Figure 5:
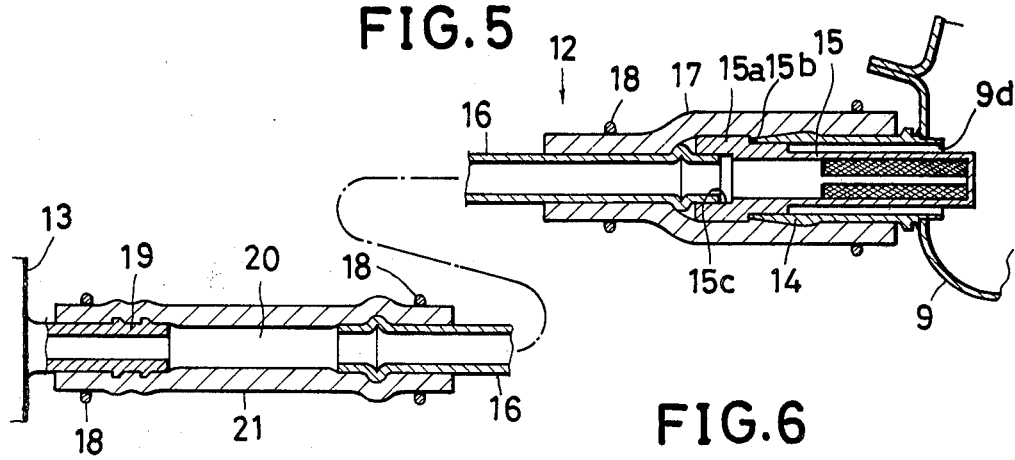
FIG. 5 is an enlarged sectional view taken along the line V—V in FIG. 2.

It is preferable, in this case, that the subsidiary fuel tank 9 and the fuel passage 12 are interconnected simply and firmly. In the illustrated example, as shown clearly in FIG. 5, an outlet opening 9d of the subsidiary fuel tank 9 is provided with a joint tube 14 fixed integrally therewith by soldering and extending forwardly therefrom, and a strainer tube 15 is conformably mounted therein and then a fuel tube 16 which is made of resin, such as nylon 11 or the like, and serves as the fuel passage 12 is conformably mounted in the same through the strainer tube 15, and a protection tube 17 of rubber or the like is mounted thereon to cover the peripheries of the tubes 15, 16.

With this arrangement, the joint tube 14 and the fuel tube 16 are connected together liquid-tightly and firmly in such a condition that there is provided therein a strainer, and the assembling work thereof becomes simple. Additionally, the connecting portion between the strainer tube 15 and the fuel tube 16 is not subjected to any unnecessary stress, so that the same can be used for a long time without being damaged.

The strainer tube 15 has an enlarged head portion 15a and thus is limited in the depth of its insertion into the joint tube 14 by a shoulder portion 15b formed at the peripheral end of the enlarged head portion 15a, and is mounted on the fuel tube 16 at its mouth opening 15c. The protection tube 17 extends longitudinally to cover the whole length of the foregoing mutually mounting portions and is applied with a pair of front and rear annular clip members 18, 18. The fuel tube 16 extends forwardly and is connected to a joint tube 19 extending from the metering pump 13 ahead thereof, but the connection between the two tubes is carried out through a protection tube 21 of rubber or the like so that there is left a gap 20 therebetween, and thus the gap 20 may serve as a longitudinal free space for the fuel tube 16.

The subsidiary fuel tank 9 is situated at a position higher than the metering pump 13 and the carburetor 11, so that involving of air or the like can be prevented and an effective fuel supply can be carried out.

Figure 2:
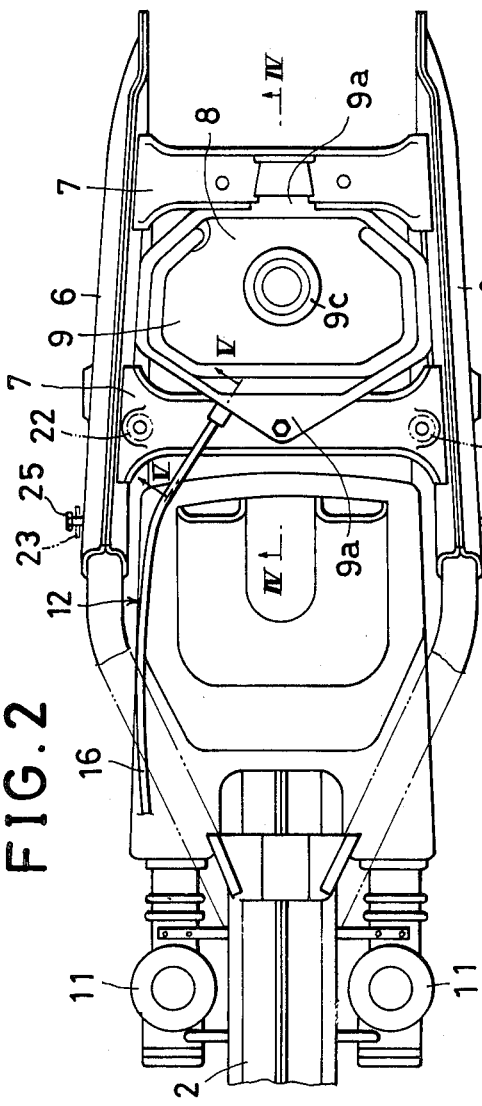
FIG. 2 is a top plan view, partly omitted, of the same.
Figure 3:
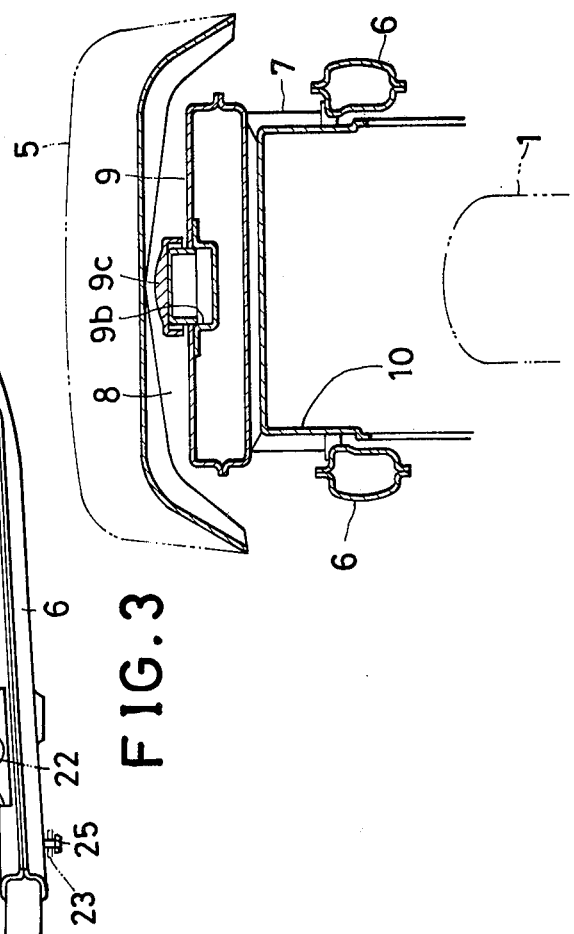
FIG. 3 is a sectional view taken along the line III—III in FIG. 1.
Figure 4:
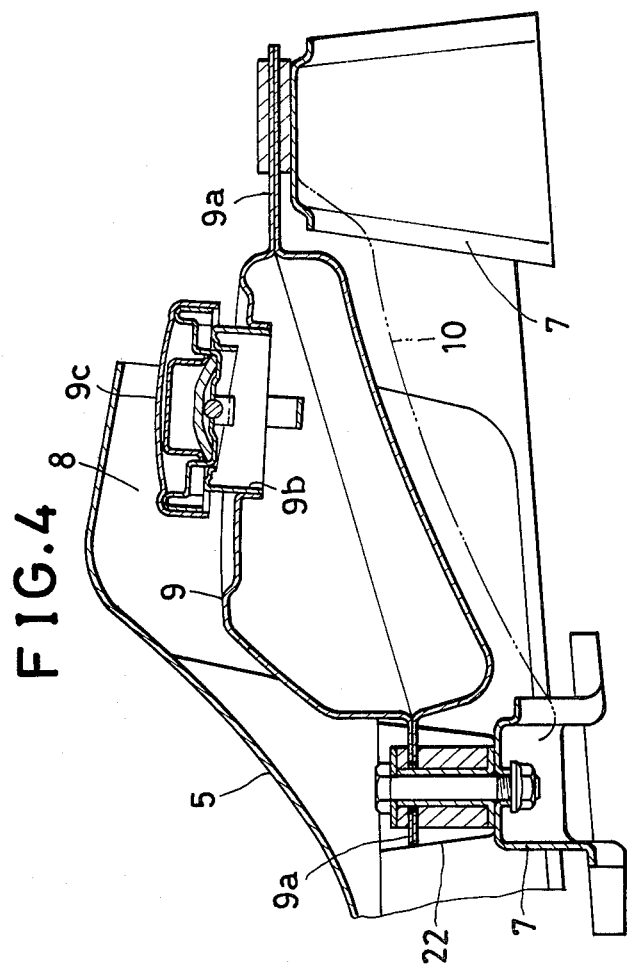
FIG. 4 is a sectional view taken along the line IV—IV in FIG. 2.
Figure 6:
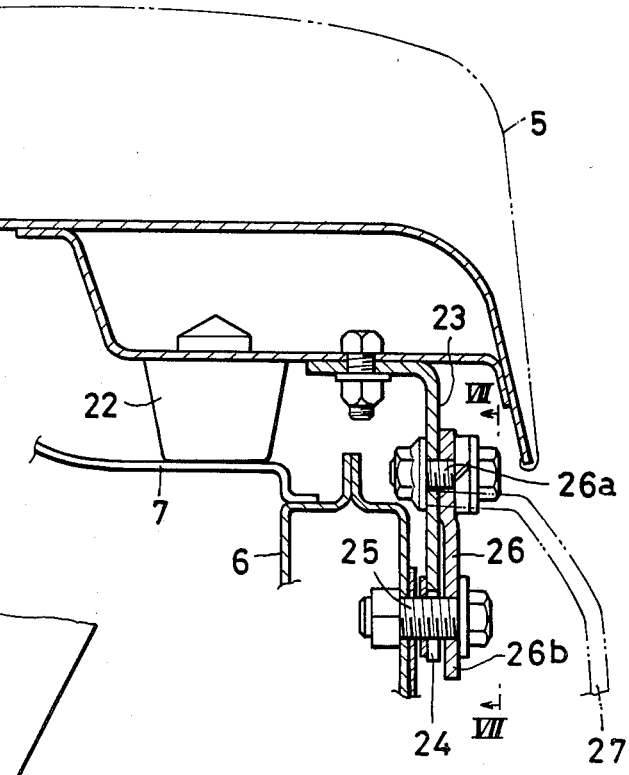
FIG. 6 is an enlarged sectional view taken along the line VI—VI in FIG. 1.

Since charging of fuel into the subsidiary fuel tank 9 is carried out after the driver's seat 5 is removed, it is desirable that the seat 5 can be attached and detached easily. In the illustrated example, as shown clearly in FIGS. 2, 6 and 7, the seat 5 is provided with at least one pair of right and left resilient seats 22, 22 on the reverse surface thereof which are to be brought into abutment with the upper surface of the vehicle body frame 2, and with at least one pair of right and left brackets 23, 23 projecting downwards therefrom. The vehicle body frame 2 is provided with at least one pair of right and left supporting members 25, 25 adapted to come into engagement with downwardly open engaging grooves 24, 24 made in the lower end portions of the respective brackets 23, 23, and each of the brackets 23, 23 is provided with a lock arm 26 in such a condition that the arm 26 is swingable between its operative position for clamping the corresponding supporting member 25 between the same and the engaging groove 24 and its inoperative position turned away therefrom.

The right and left resilient seats 22, 22 are arranged to be brought into abutment with and be supported on the front cross member 7, and respective bolts serving as the supporting members 25, 25 are provided on both outer surfaces of the stays 6, 6 so as to project outwards.

Numeral 26a denotes a pivot shaft for pivotally supporting the base end of the lock arm 26, numeral 26b denotes an engaging portion of the lock arm 26 formed into a cam form and having a self-lock function, and numeral 26c denotes a upright portion of the lock arm 26 serving as a handling holder.

For attaching the seat 5 in position, the same is placed on the cross member 7 through its resilient seats 22, 22 and the respective brackets 23, 23 are brought into engagement at its respective engaging grooves 24, 24 with the respective supporting members 25, 25. Thereafter the seat 5 is pushed downwards slightly and under the compressed condition of the resilient seats 22, 22 the lock arms 26, 26 are turned to the operative positions shown by solid lines in FIG. 7. Thereby the lock arms 26, 26 are kept in reliable engagement with the supporting members 25, 25 at the engaging portions 26b, 26b under the application of the resilient forces of the resilient seats 22, 22, and consequently the seat 5 is firmly connected to the vehicle body frame 2.

Figure 7:
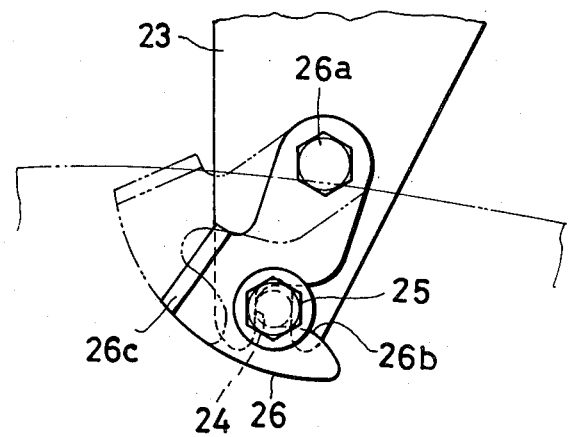
FIG. 7 is a sectional view taken along the line VII—VII in FIG. 6.

For detecting the seat 5 therefrom, the same is pushed downwards slightly against the action of the resilient seats 22, and under this condition, the lock arm 26 is turned sideways to its inoperative position as shown by chain lines in FIG. 7. Thereby, the seat 5 is released from its engagement connection, and the same can be detached by being moved upwards, and consequently charging of fuel to the subsidiary fuel tank 9 can be carried out easily.

By using a side cover 27 shown by chain lines, the connecting portion of the seat 5 is covered therewith, and thus the appearance of the vehicle is not spoiled and it is protected against theft.

Thus, according to this invention, the subsidiary fuel tank is provided on the rear portion of the vehicle body frame, so that the starting property of the engine can be improved by the provision of gasoline fuel, for instance, contained therein. Additionally, the tank is housed in the space formed below the seat and between the pair of front and rear cross members extending between the right and left back stays, so that the same is protected from any external force and is not damaged thereby and is additionally protected from the heat generating portion of the engine and is decreased in fuel evaporation loss. Additionally, the seat over the tank is detachable, so that charging of fuel into the tank can be carried out simply by detaching the seat.

We claim:

1. An auxiliary fuel tank apparatus for use in a motorized two-wheeled vehicle comprising a body frame having front and rear wheels, a heat generating portion including an internal combustion engine on the central portion of said frame, a fuel tank on the upper side of said frame, and a detachable driver's seat mounted on said body frame to the rear of said fuel tank, said body frame including a rear portion having a pair of right and left support bars positioned below said driver's seat and a pair of front and rear cross members extending across said support bars, wherein a space is formed between said cross members below said driver's seat and apart from the heat generating portion, and an auxiliary fuel tank fixedly mounted in said space.

2. An auxiliary fuel tank apparatus as claimed in claim 1 including a fuel passage and a metering pump, wherein said auxiliary fuel tank is coupled, through said fuel passage and said metering pump interposed in said fuel passage, to a carburetor of said engine.

3. An auxiliary fuel tank apparatus as claimed in claim 2 wherein said auxiliary fuel tank is mounted on said body frame at a position higher than said carburetor and said metering pump.

4. An auxiliary fuel tank apparatus as claimed in claim 1 including an interconnecting section between said auxiliary fuel tank and said fuel passage, said interconnecting section including a joint tube fixed at an outlet opening in said auxiliary fuel tank and extending therefrom, a strainer tube and a fuel tube forming said fuel passage, and a protection tube mounted on said fuel passage to cover the surface thereof.

5. An auxiliary fuel tank apparatus as claimed in claim 1 wherein said driver's seat includes at least a pair of resilient pads fixed to the under surface of said seat, said pads being positioned to be brought into abutment with the upper surface of said body frame, a pair of brackets projecting downwardly from said seat, and wherein said body frame includes at least one pair of supporting members positioned to be brought into engagement with respective downwardly open engaging grooves formed in the lower end portions of said brackets, each of said brackets having a lock arm which is swingable between an operative position for engaging the corresponding supporting member and said engaging groove of said brackets, and an inoperative position.

6. An auxiliary fuel tank apparatus as claimed in claim 5 wherein each of said lock arms includes an engaging portion arranged to be in engagement with each of said supporting members when said resilient pads apply a resilient force to said body frame.

7. An auxiliary fuel tank apparatus as claimed in claim 5 wherein said resilient pads are positioned to be brought into abutment with, and supported by, one of said cross members, and said supporting members are provided on the outer side surfaces of said support bars.

8. An auxiliary fuel tank apparatus as claimed in claim 1 in which said space is also closed at its lower or bottom portion by a rear fender of the vehicle body.

9. The auxiliary fuel tank apparatus as claimed in claim 8 in which said space is in a rear portion of the vehicle frame and is apart from the heat generating portion so that the auxiliary fuel tank is protected from external forces and from heat generated by the vehicle engine.

* * * * *